US012723614B1

(12) United States Patent
Kooima et al.

(10) Patent No.: US 12,723,614 B1
(45) Date of Patent: Sep. 1, 2026

(54) FASTENER SYSTEM WITH ENHANCED WEAR RESISTANCE FEATURES FOR ABRASIVE ENVIRONMENTS

(71) Applicants: Phil Kooima, Rock Valley, IA (US); Nicholas Vande Waerdt, Rock Valley, IA (US)

(72) Inventors: Phil Kooima, Rock Valley, IA (US); Nicholas Vande Waerdt, Rock Valley, IA (US)

(73) Assignee: Kooima Ag, Inc., Rock Valley, IA (US)

(*) Notice: Subject to any disclaimer, the term of this patent is extended or adjusted under 35 U.S.C. 154(b) by 515 days.

(21) Appl. No.: 18/228,738

(22) Filed: Aug. 1, 2023

(51) Int. Cl.
*F16B 23/00* (2006.01)
*F16B 33/06* (2006.01)
*F16B 35/06* (2006.01)

(52) U.S. Cl.
CPC .......... *F16B 23/0007* (2013.01); *F16B 33/06* (2013.01); *F16B 35/06* (2013.01); *F16B 2200/00* (2018.08)

(58) Field of Classification Search
CPC ........ F16B 35/06; F16B 33/06; F16B 23/003; F16B 23/0007; F16B 23/0023; F16B 23/0015; F16B 23/0038; F16B 23/00; F16B 23/0061; A01F 29/095; A01D 43/08
USPC ................. 411/383, 900, 901, 396, 402–407
See application file for complete search history.

(56) References Cited

U.S. PATENT DOCUMENTS

| | | | | |
|---|---|---|---|---|
| 2,229,565 A * | 1/1941 | Hallowell, Jr. | F16B 35/00 | 29/DIG. 24 |
| 3,574,080 A * | 4/1971 | Jones | F16B 33/00 | 204/196.18 |
| 5,332,348 A * | 7/1994 | Lemelson | C23C 16/274 | 411/902 |
| 5,897,177 A * | 4/1999 | Bergstrom | B62D 55/27 | 305/180 |
| 6,109,851 A * | 8/2000 | Bauer | C21D 9/0093 | 411/387.7 |
| 7,695,078 B2 * | 4/2010 | Lefgren | A43C 15/061 | 305/180 |
| 10,377,020 B2 * | 8/2019 | Campbell | B25B 23/105 | |
| 10,427,736 B2 * | 10/2019 | Blackburn | B62D 55/286 | |
| 2007/0041807 A1 * | 2/2007 | Gouda | F16B 35/06 | 411/373 |
| 2007/0243044 A1 * | 10/2007 | Chen | F16B 33/06 | 411/427 |
| 2019/0126283 A1 * | 5/2019 | Weinberg | A01D 43/08 | |

* cited by examiner

*Primary Examiner* — Flemming Saether
(74) *Attorney, Agent, or Firm* — Jeffrey A. Proehl; Woods, Fuller, Shultz & Smith PC

(57) ABSTRACT

A fastener may include a threaded shank and a head having a crown having a crown surface. The crown surface may define a crown plane with a central portion and a peripheral portion. The head further having a perimeter for being engaged by a tool for manipulating the fastener. The fastener having a protective coating positioned on the crown of the head and being positioned on the peripheral portion of the crown. The head and the shank may be formed of a first material having a first hardness measurement, and the protective coating may be formed of a second material having a second hardness measurement. The second material may be different than the first material and a magnitude of the second hardness measurement may be greater than the magnitude of the first hardness measurement.

20 Claims, 8 Drawing Sheets

FASTENER SYSTEM WITH ENHANCED WEAR RESISTANCE FEATURES FOR ABRASIVE ENVIRONMENTS

BACKGROUND

Field

The present disclosure relates to fasteners and more particularly pertains to a new fastener system with enhanced wear resistance features for abrasive environments for facilitating preservation of the ability to manipulate the fastener.

SUMMARY

In some aspects, the present disclosure relates to a fastener configured to fasten one part to another part. The fastener may be elongated along a longitudinal axis. The fastener may include a shank being elongated along the longitudinal axis, and have a base end and a free end. The shank may have a shank surface with a portion of the shank surface forming threads. The fastener may include a head positioned on the base end of the shank. The head has a crown having a crown surface, and the crown surface defines a crown plane. The crown surface may have a central portion and a peripheral portion. The head also has a perimeter configured to be engaged by a tool for manipulating the fastener, and the perimeter and the crown may converge at a peripheral edge surrounding the crown. The fastener may also include a protective coating positioned on the head, and the coating may be positioned on the peripheral portion of the crown of the head. The coating may extend from the peripheral edge inwardly toward the central portion of the crown. The head and the shank may be formed of a first material having a first hardness measurement, and the protective coating may be formed of a second material having a second hardness measurement. The second material may be different than the first material and a magnitude of the second hardness measurement is greater than the magnitude of the first hardness measurement.

In other aspects, the present disclosure relates to a fastener configured to fasten one part to another part. The fastener may be elongated along a longitudinal axis. The fastener may include a shank being elongated along the longitudinal axis, and have a base end and a free end. The shank may have a shank surface with a portion of the shank surface forming threads. The fastener may include a head positioned on the base end of the shank. The head has a crown having a crown surface, and the crown surface defines a crown plane. The crown surface may have a central portion and a peripheral portion. The peripheral portion may substantially surround the central portion. The head also has a perimeter configured to be engaged by a tool for manipulating the fastener, and the perimeter and the crown may converge at a peripheral edge surrounding the crown. The perimeter of the head may have a plurality of flats, and the flats each being substantially planar and extending in a respective flat face plane. The flat face planes of the flats may be oriented substantially perpendicular to the plane of the crown surface, and adjacent flats of the perimeter may converge at point edges. The point edges may extend substantially parallel to the longitudinal axis of the fastener. The fastener may also include a protective coating positioned on the head, and the coating may be positioned on the peripheral portion of the crown of the head. The coating may extend from the peripheral edge inwardly toward the central portion of the crown. The coating may extend along a continuous path along the perimeter of peripheral portion of the crown surface about the central portion of the crown surface, and the central portion of the crown surface may be free of the protective coating and the flats of the perimeter of the head may be free of the protective coating. The head and the shank may be formed of a first material having a first hardness measurement, and the protective coating may be formed of a second material having a second hardness measurement. The second material may be different than the first material and a magnitude of the second hardness measurement is greater than the magnitude of the first hardness measurement.

In still other aspects, the present disclosure relates to a system that comprises a harvester having a cutterhead configured to cut plant materials received by the harvester. The cutterhead may have a central drum, a plurality of knife mounting bases on an exterior of the central drum, and a plurality of knives each removably mounted on one of the knife mounting bases. The system may also include a plurality of fasteners, with each fastener fastening a said knife to a said knife mounting base. Each fastener may be elongated along a longitudinal axis. Each fastener may include a shank being elongated along the longitudinal axis, and have a base end and a free end. The shank may have a shank surface with a portion of the shank surface forming threads. The fastener may include a head positioned on the base end of the shank. The head has a crown having a crown surface, and the crown surface defines a crown plane. The crown surface may have a central portion and a peripheral portion. The head also has a perimeter configured to be engaged by a tool for manipulating the fastener, and the perimeter and the crown may converge at a peripheral edge surrounding the crown. Each fastener may also include a protective coating positioned on the head, and the coating may be positioned on the peripheral portion of the crown of the head. The coating may extend from the peripheral edge inwardly toward the central portion of the crown. The head and the shank may be formed of a first material having a first hardness measurement, and the protective coating may be formed of a second material having a second hardness measurement. The second material may be different than the first material and a magnitude of the second hardness measurement is greater than the magnitude of the first hardness measurement.

In still further aspects, the present disclosure relates to a fastener configured to fasten one part to another part. The fastener may be elongated along a longitudinal axis. The fastener may include a shank being elongated along the longitudinal axis, and have a base end and a free end. The shank may have a shank surface with a portion of the shank surface forming threads. The fastener may include a head positioned on the base end of the shank. The head has a crown having a crown surface, and the crown surface defines a crown plane. The crown surface may have a central portion and a peripheral portion. The head also has a perimeter configured to be engaged by a tool for manipulating the fastener, and the perimeter and the crown may converge at a peripheral edge surrounding the crown. The head of the fastener may include a perimeter recess positioned between the crown and the perimeter of the head. The fastener may also include a protective rim positioned in the perimeter recess of the head, the protective rim extending substantially continuously about the crown of the head. The head and the shank may be formed of a first material having a first hardness measurement, and the protective rim may be formed of a second material having a second hardness measurement. The second material may be different than the first material and a magnitude of the second hardness measurement is greater than the magnitude of the first hardness measurement.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
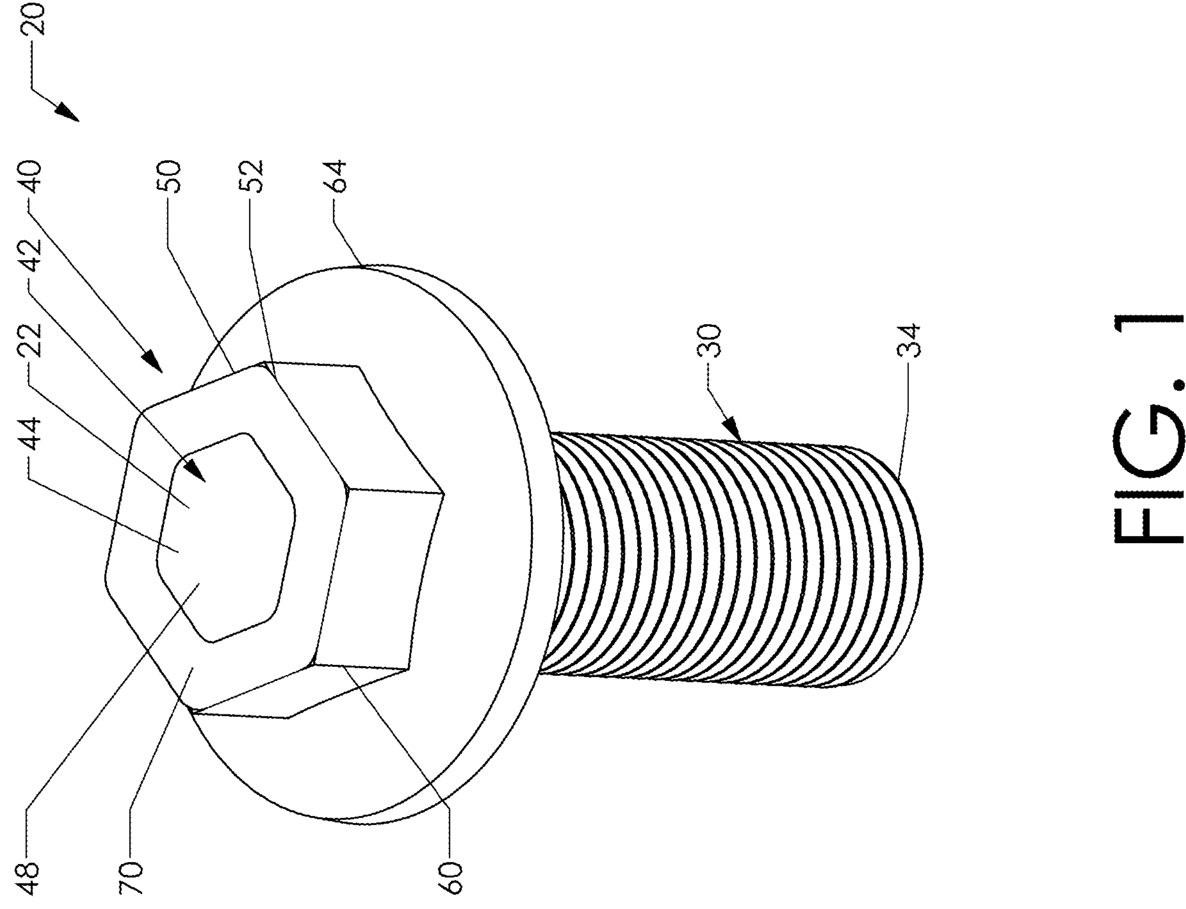
FIG. 1 is a schematic perspective view of an individual fastener of the new fastener system of the disclosure.
Figure 2:
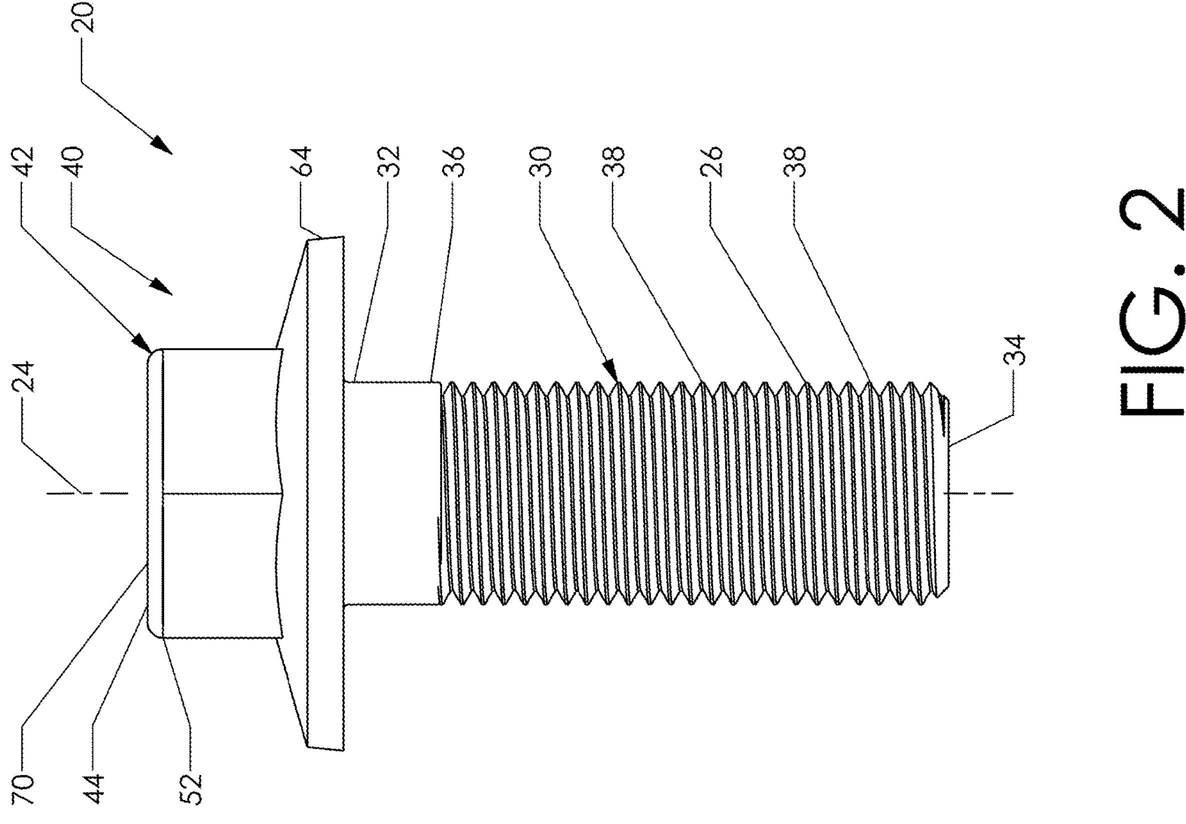
FIG. 2 is a schematic side view of the fastener, according to an illustrative embodiment.
Figure 3:
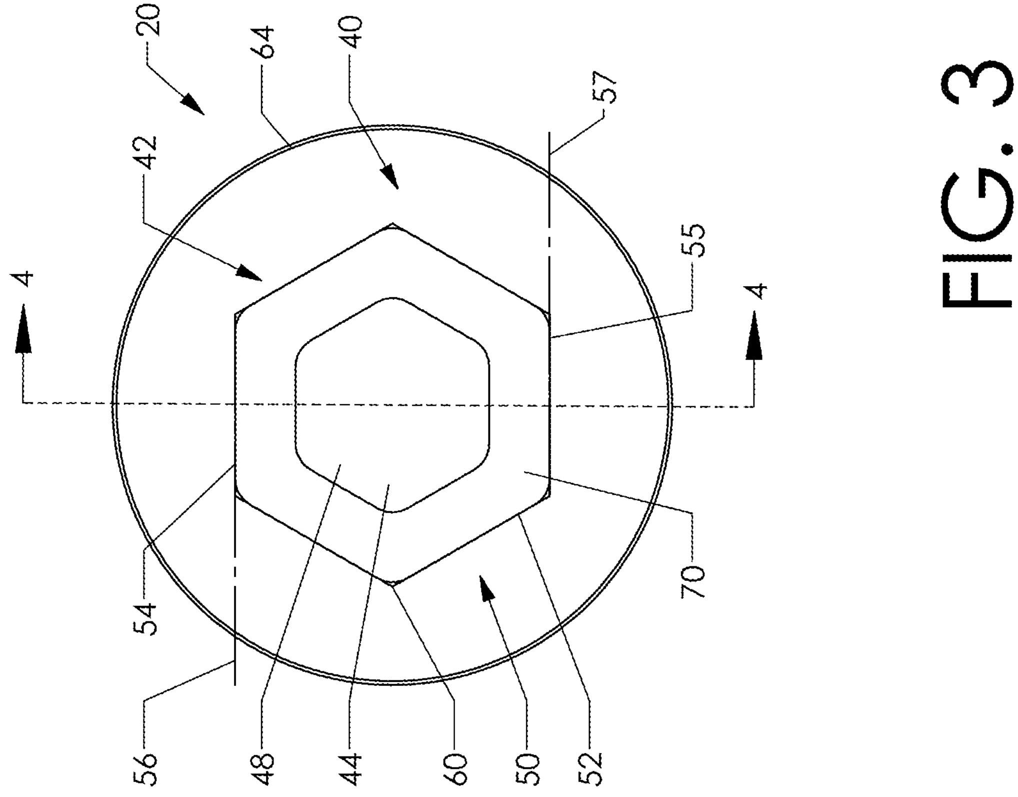
FIG. 3 is a schematic top view of the fastener, according to an illustrative embodiment.
Figure 4:
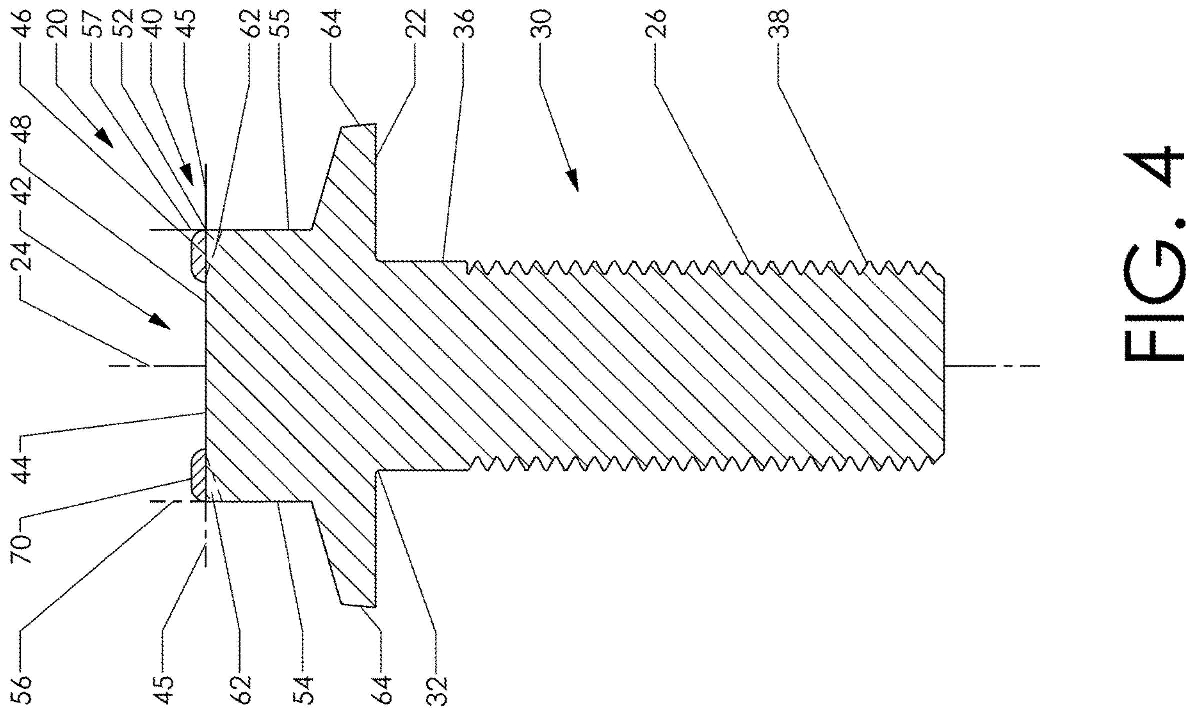
FIG. 4 is a schematic sectional view of the fastener taken along line 4-4 of FIG. 3, according to an illustrative embodiment.
Figure 5:
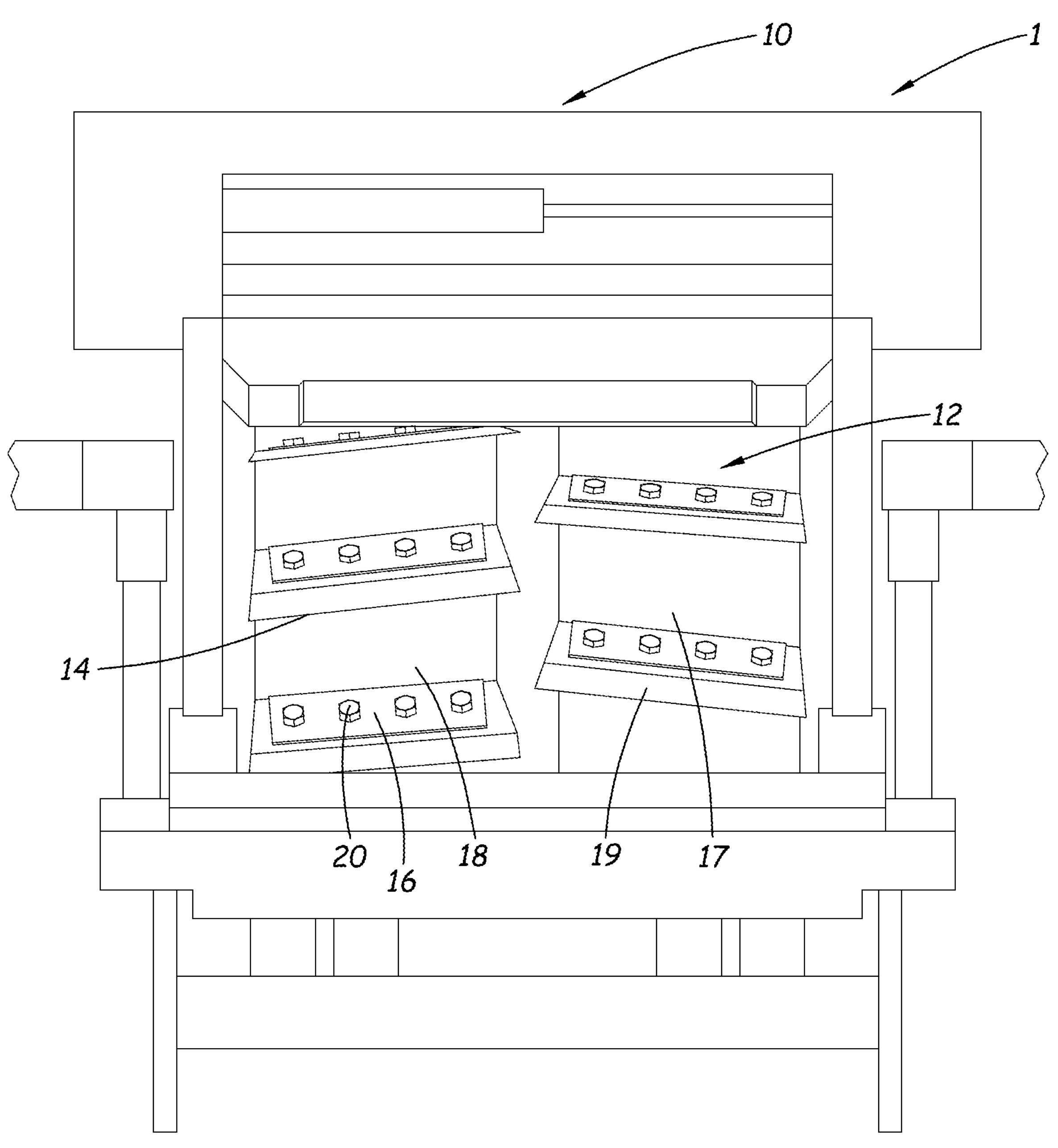
FIG. 5 is a schematic front view of a forage harvester with portions removed to reveal detail of elements of the cutterhead, according to an illustrative embodiment.

With reference now to the drawings, and in particular to FIGS. 1 through 8 thereof, a new fastener system having a fastener with enhanced wear resistance features for exposure to abrasive environments embodying the principles and concepts of the disclosed subject matter will be described.

The applicants have recognized that the need for enhanced wear resistance in abrasive environments relates not only to the primary parts of equipment, but also fasteners used to connect the equipment parts together. One example is the fasteners used to connect a wear part, or a part subject to periodic replacement due to wear caused by abrasion of the materials against the part. An illustrative example is the knives used to cut crop materials during processing, and the fasteners utilized to fasten those knives to a base structure.

Although the fasteners may typically be replaced when the parts fastened by the fasteners are replaced, it has been recognized that the wear occurring on the fasteners tends to complicate replacement of the parts and the fasteners by making removal of the fasteners, and thus the parts, more difficult.

Often, the wear occurring on the fastener can extend to the surfaces of the fastener that are engaged by a tool to rotate and remove the fastener from the part or parts being fastened. More specifically, fasteners such as machine bolts may have surfaces, or "flats," that are engaged by a tool such as a wrench or a socket to rotate the fastener with respect to one or both of the fastened parts, or with respect to another part of the fastener, to unthread the fastener from the part or from the other part of the fastener. For example, a tool may be used to engage the flats on opposite sides of the head of the machine bolt and rotate the head and shank of the bolt with respect to threads formed on a part or on a threaded nut. As another example, a tool may be used to engage the points, or edges of the machine bolt head located between adjacent flats.

The applicants have further recognized that exposure of the machine bolt and/or nut to an abrasive environment can not only decrease the size of the flat able to be engaged by a tool, and as a result the tool is unable to apply enough force to the bolt head or nut. Additionally, or alternatively, the abrasion may also "round off" the points on the head or nut by removing material from the fastener that forms the edges of the points between the flats. If the tool is unable to contact a sufficient area of the fastener to rotate the fastener, the fastener must be cut into pieces, typically by utilizing a cutting torch, to release the part.

Moreover, corrosion of the material of the fastener or the part, as well as debris becoming lodged between the fastener and the part, can require a significantly greater amount of force to be applied to the fastener to remove the fastener as compared to the amount of force originally applied to the fastener to install the fastener on the part.

The applicants have developed a fastener system for providing a significant degree of protection to the integrity of the fastener to be engaged by a tool, such as a wrench. The fastener system provides enhanced protection of the structure of the flats and/or the points of the fastener, without adding material to the flats (or to the points), which may distort the geometry of the flats and/or points, and as a result may impair the ability of a tool to properly engage the flats and/or points and apply the maximum degree of rotational force to the fastener.

The coating is preferably positioned at locations on the fastener most likely to be contacted and abraded by materials such as crop elements being processed by the parts. Illustratively, application of material of the protective coating may be limited to the top or crown of the head of the machine bolt without extending to the flats of the bolt head.

Moreover, embodiments of the protective coating may permit the amount of material added to the fastener to be minimized to only those portions of the fastener that are necessary to provide the protective or preservative effect without unnecessarily adding weight or material to the fastener. For example, the material of the coating may be applied primarily, and optionally exclusively, to a peripheral region of the top or crown of a machine bolt head to minimize wear occurring to the peripheral edge of the crown as well as the flats and the points edges. A further benefit of the fastener system of the disclosure is that a relatively harder material does not have to be employed for the entirety of the fastener, which helps minimize the cost of the fastener and may limit the brittleness of the fastener.

In some exemplary embodiments, the disclosure relates to a system 1 comprising a machine and one or more fasteners that secure parts of the machine together but may need to be removed in order to service or remove and replace the parts of the machine. Suitably, the machine processes material having an abrasive effect on the fastener or fasteners as well as the parts affixed by the fasteners. It should be recognized that the abrasive effect of the material being processed may arise from the movement of the material in the machine rather than the material being inherently abrasive in character.

In illustrative embodiments of the disclosure, the machine comprises a harvester 10 for processing crop materials, typically at high throughput rates, and may comprise a forage harvester for cutting crop materials into pieces for use as silage. The forage harvester 10 may have a cutterhead 12 which rotates on the machine to produce the cutting of the plants of the crop material. In greater detail, the cutterhead may include a central drum 14 rotatably mounted on the frame of the machine, and a plurality of knife mounting bases 16, 17 may in turn be mounted on an exterior of the central drum 14. The cutterhead 12 also includes at least one, and typically a plurality of knives 18, 19 which are individually removably fastened on the drum via a respective one of the knife mounting bases.

Parts of the machine, such as the knives 18, 19, are fastened on other parts of the machine, such as the knife mounting bases 16, 17, by one or more fasteners 20 for fastening one part to another part, such as a knife 18 to a knife mounting base 16. The fastener 20 has an outer surface 22 and is typically elongated along a longitudinal axis 24. The fastener 20 may have a threaded surface portion 26 for removably mounting another fastener element, such as a complementarily threaded nut.

The fastener 20 may include a shank 30 which is elongated along the longitudinal axis 24 and has a base end 32 and a free end 34 at the opposite extremes of the shank. The shank 30 has a shank surface 36, which may be generally cylindrical in shape, and a portion of the shank surface may form threads 38 of the threaded surface portion 26 toward the free end 34.

The fastener may additionally include a head 40 that is positioned on the base end 32 of the shank. The head 40 may have a crown 42 at one end of the fastener. The crown 42 may have a crown surface 44, and the crown surface may define a crown plane 45, which may be oriented substantially perpendicular to the longitudinal axis 24 of the fastener. The crown surface 44 may have a peripheral portion 46 and a central portion 48 which may be surrounded or substantially surrounded by the peripheral portion. Both the peripheral 46 and central 48 portions may be positioned in the crown plane 45, although a coplanar relationship is not necessary.

The head 40 of the fastener 20 may also have a perimeter 50 situated about the crown 42. The perimeter 50 may be oriented substantially perpendicular to the crown 42, and the perimeter and the crown may converge at a peripheral edge 52. The perimeter 50 may be physically configured in a manner that facilitates engagement by a tool used to manipulate the fastener, such as rotate the fastener. The perimeter 50 may have a plurality of flats 54, 55 which are positioned about the head in continuous or substantially continuous manner. In the illustrative embodiments, the head 40 has six flats (forming a hexagonal shape), although different numbers of flats may be employed, such as four flats (forming a square shape) or more than six flats may be employed. Each of the flats 54, 55 may be flat or substantially planar in shape and may be situated in a respective flat face plane 56, 57. In the illustrative embodiments, the flat face planes that are positioned adjacent to each other are oriented oblique to each other. The planes of the flats may be oriented perpendicular or substantially perpendicular to the crown plane 45 of the crown surface. Adjacent flats of the perimeter 50 may converge at point edges 60 which may extend substantially parallel to the longitudinal axis 24 of the fastener and perpendicular to the crown plane 45.

In some embodiments, the peripheral portion 46 of the crown surface 44 may include a chamfered area 62 which is positioned adjacent to the peripheral edge 52 and which deviates slightly from the crown plane 45 toward the peripheral edge 52, and more so toward the point edges 60. Further, some embodiments of the fastener 20 may include a flange 64 positioned on the head 40 adjacent to the shank 30, and the flange may extend outwardly with respect to the perimeter 50 of the head.

The fastener 20 further has a protective coating 70 positioned on the head 40. The coating 70 may be positioned on the crown 42 of the head, and may be applied to the crown surface in a manner that bonds the coating to the crown surface. In the illustrative embodiments, the coating 70 may be positioned on the peripheral portion 46 of the crown surface, and may extend from the peripheral edge 52 inwardly toward the central portion 48 of the crown surface. In embodiments, the coating 70 may not extend to the central portion 48 of the crown surface, and thus may be absent from the central portion.

The protective coating 70 may protrude from the crown surface 44 and out of the crown plane 45 of the head. The coating 70 has a thickness which may be measured in the direction parallel to the longitudinal axis 24 of the fastener. The thickness of the coating may vary at different areas of the crown surface 44. Illustratively, the thickness may decrease toward the peripheral edge 52 and increase away from the peripheral edge, and also decrease toward the central portion 48, to provide a cross-sectional profile which has an arcuate upper boundary with a substantially straight lower boundary, which in some embodiments may follow the curvature of the crown surface 44 in the chamfered area 62.

The coating 70 may extend along a path which may be continuous about the central portion and may follow the peripheral edge 52 of the head and extend to the intersections of the point edges and peripheral edge to enhance protection of the peripheral edge and regions of the point edges. The outer perimeter shape of the coating may thus follow the shape of the peripheral edge 52, while the inner perimeter shape of the coating may mirror the outer perimeter shape so that the width of the coating is substantially uniform in a direction parallel to the crown plane. Optionally, the width of the coating may vary along the path of the coating. As still a further option, the coating 70 may be coextensive with the crown surface 44, although it is believed that such coverage is not necessary to adequately protect the flats and preserve the ability of the flats to be engaged by a tool such as a wrench.

Significantly, the flats 56, 57 of the perimeter of the head may be maintained free of the coating 70, and the coating may not extend into or beyond the flat face planes which may facilitate the ability of the tool to engage the flats in a suitable manner.

The head 40 of the fastener may be formed of a first material, and typically the shank 30 is formed of the same material as the head. The first material may exhibit a first hardness measurement. Illustratively, the magnitude of the first hardness measurement may be less than approximately 45 Rockwell C hardness. In some illustrative implementations, the magnitude of the first hardness measurement may be in the range of approximately 25 Rockwell C hardness to approximately 45 Rockwell C hardness.

The coating 70 may be formed of a second material which is different than the first material. Significantly, the second material forming the coating 70 may exhibit a second hardness measurement, and the magnitude of the second hardness measurement is greater than the magnitude of the first hardness measurement. Illustratively, the magnitude of the second hardness measurement may be greater than approximately 40 Rockwell C hardness. In some illustrative implementations, the magnitude of the second hardness measurement may be in the range of approximately 40 Rockwell C hardness to approximately 75 Rockwell C hardness. Some highly suitable second materials contain tungsten carbide to enhance the wear resistance of the coating.

The formation of the coating 70 on the head 40 of the fastener may be performed by any suitable technique. The most advantageous techniques limit the amount of heat involved in the process, and particularly the amount of heat transferred to the fastener, to maintain the strength and general integrity of the fastener the after the application of the coating to the head has been performed without affecting any heat treatment of the fastener. One highly suitable technique for forming the coating 70 on the head uses a laser metal deposition technique which requires relatively low levels of heat input and thus may limit the amount of heat transferred to the fastener and the size of the heat affected zone. Optionally, other techniques may be utilized including, for example, a flame spray technique.

It will be recognized that in addition to the illustrative application presented in this disclosure, other advantageous applications of fasteners having the disclose features may be apparent to those skilled in the art. Some illustrative applications include, for example, fastening mixer knives on livestock feed mixer wagons, fasteners present on wood chipping equipment, fasteners utilized on snowplow blades and road maintainers, fasteners utilized on equipment moved into and out of oil well holes, and generally on any equipment exposed to an abrasive environment or abrasive materials.

In addition to the benefits of the disclosure for machine bolt heads having four, six, or more flats on the outward surface of the bolt head, aspects of the disclosure may be utilized to protect or preserve the functionality of inward or interior tool engagement features, such as in the case of a fastener having a socket formed in the head, for example, a socket head cap screw having a hexagonal socket to be operated by a hexagonal tool. The coating 70 may reduce wear on the portions of the bolt head forming the socket to preserve the integrity of the socket.

Figure 6:
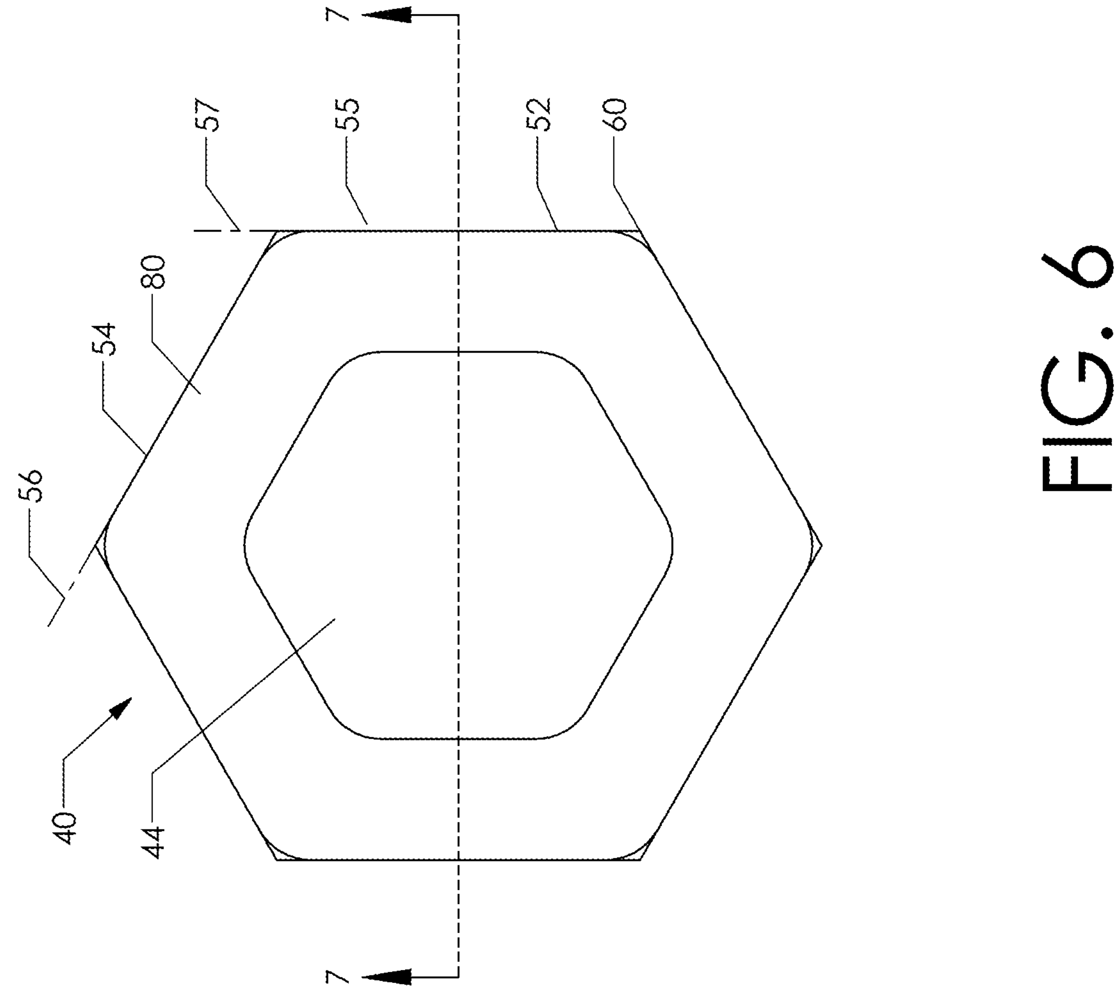
FIG. 6 is a schematic top view of an optional configuration of the fastener having a head with a recess formed therein and a protective rim, according to an illustrative embodiment.
Figure 7:
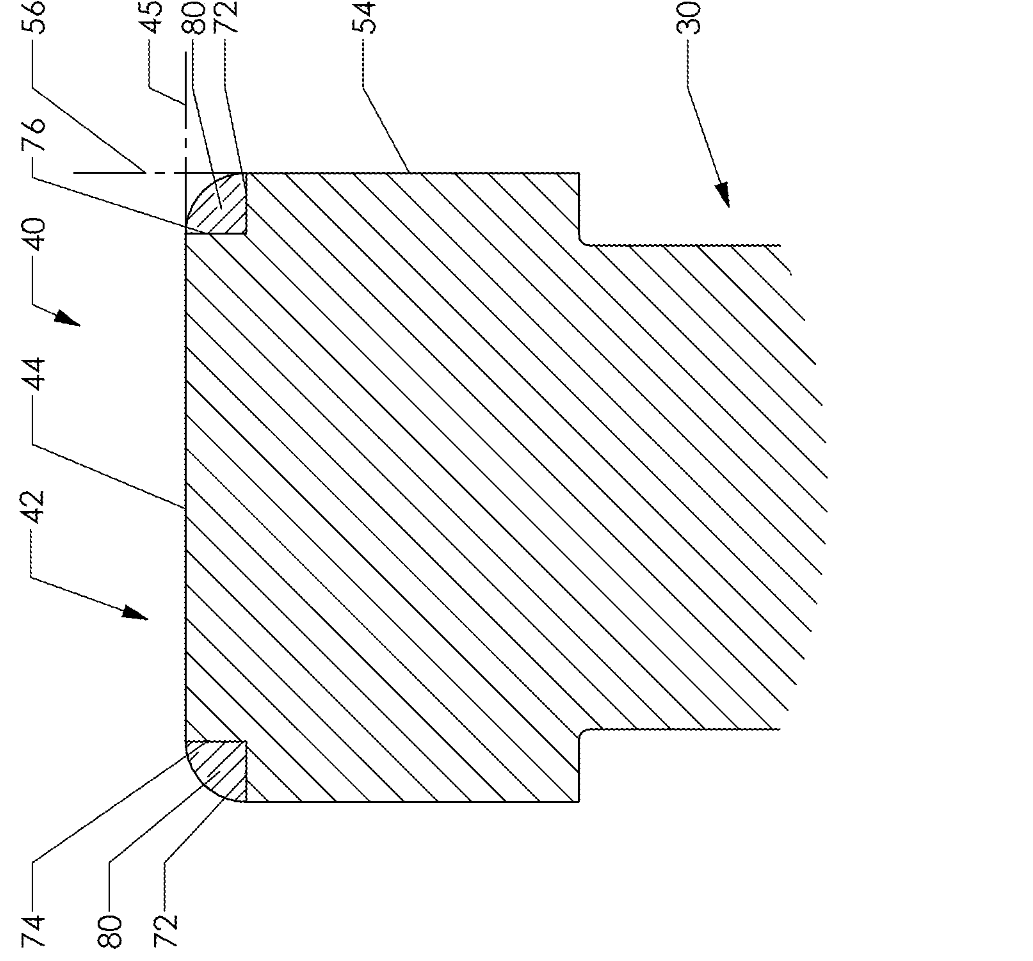
FIG. 7 is a schematic side sectional view of an upper portion of the optional configuration of the fastener taken along line 7-7 of FIG. 6, according to an illustrative embodiment.
Figure 8:
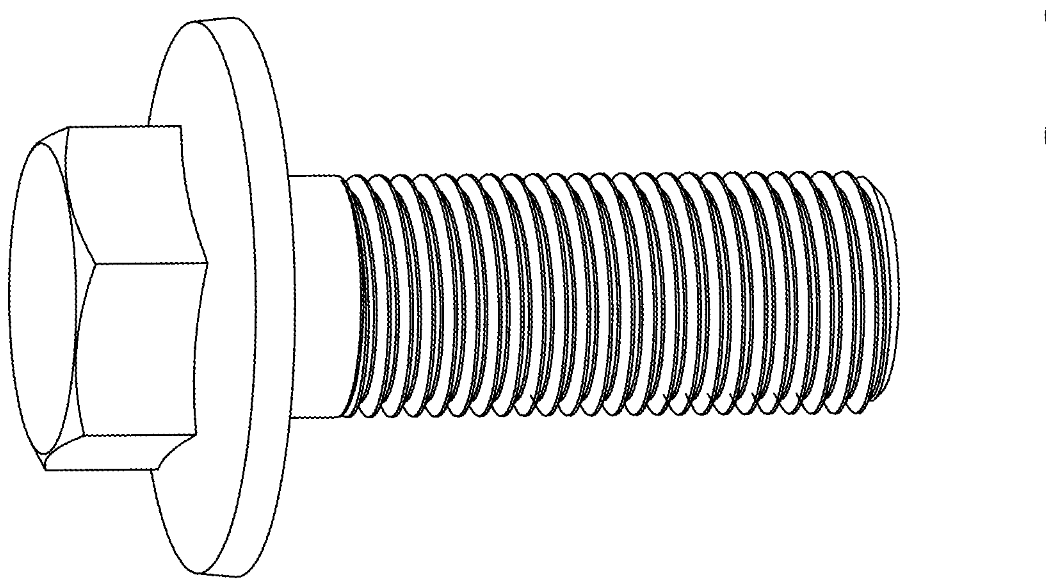
FIG. 8 is a schematic perspective view of a conventional fastener of the prior art.

An optional variation may further incorporate the protective material into the head of the fastener 20, such as is shown in FIGS. 6 and 7. In such embodiments, the head 40 of the fastener may include a perimeter recess 72 that is positioned between the crown 42 and the perimeter 50 of the head. The perimeter recess 72 may be formed at a convergence of the crown surface 44 and the surfaces of the perimeter flats 54, 55 of the head. The perimeter recess 72 may extend along the convergence of the crown surface 44 and the perimeter 50 of the head. The perimeter recess 72 may be depressed or indented into the head with respect to the crown plane 45, and optionally may have a curve, concave cross-sectional shape. The perimeter recess 72 may have a plurality of recess sections 74, with each of the recess sections 74 corresponding to one of the flats 54, 55 of the perimeter. Each of the recess sections 74 may be depressed or indented into the head with respect to the flat face plane 56, 57 of the corresponding flats of the perimeter.

A protective rim 80 may be positioned in the perimeter recess 72 of the head, and may extend about the crown 42 of the head. The protective rim 80 may be formed of a second material exhibiting greater hardness than a first material forming the base material of the head, and correspondingly the rim 80 may have a second hardness greater than the first hardness. The protective rim 80 may be positioned in each of the recess sections 74 of the recess and may extend continuously, or substantially continuously, about the crown 42. In some embodiments, the profile of the protective rim 80 may exhibit a degree of curvature or rounding in transition between the crown surface 44 and the surfaces of the perimeter flats 54, 55. Optionally, the protective rim 80 may have a more squared off profile, following the crown plane 45 and the flat face planes 56, 57 to thereby form a peripheral edge 52 on the head 40 of the fastener. In embodiments, the material of the protective rim 80 may not extend beyond the crown plane 45 of the crown surface to permit the shape and configuration of the head 40 of the fastener to generally preserve the geometry of a typical fastener. Further, the material of the protective rim 80 may not extend beyond the flat face planes 56, 57 of the flats of the perimeter 52 also generally preserve the geometry of the typical fastener.

It should be appreciated that in the foregoing description and appended claims, that the terms "substantially" and "approximately," when used to modify another term, mean "for the most part" or "being largely but not wholly or completely that which is specified" by the modified term, and may be further quantified as values or qualities which deviate approximately 10 percent or less from the value or quality or relationship stated in the disclosure.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A fastener configured to fasten one part to another part, the fastener being elongated along a longitudinal axis, the fastener including:

a shank being elongated along the longitudinal axis, the shank having a base end and a free end, the shank having a shank surface with a portion of the shank surface forming threads;

a head positioned on the base end of the shank, the head having:

a crown having a crown surface, the crown surface defining a crown plane, the crown surface having a central portion and a peripheral portion; and a perimeter configured to be engaged by a tool for manipulating the fastener, the perimeter and the crown converging at a peripheral edge, the peripheral edge surrounding the crown; and a protective coating positioned on the head, the coating being positioned on the peripheral portion of the crown of the head, the coating extending from the peripheral edge inwardly toward the central portion of the crown;

wherein the head and the shank are formed of a first material having a first hardness measurement, the protective coating being formed of a second material having a second hardness measurement, wherein the second material is different than the first material and a magnitude of the second hardness measurement is greater than the magnitude of the first hardness measurement;

wherein the peripheral portion substantially surrounds the central portion; and wherein the protective coating does not extend to the central portion of the crown surface of the crown of the head.

2. The fastener of claim 1 wherein the coating extends along a continuous path along the perimeter of peripheral portion of the crown surface adjacent to the peripheral edge and about the central portion of the crown surface.

3. The fastener of claim 1 wherein the coating protrudes from the crown of the head and the crown plane of the crown surface.

4. A fastener configured to fasten one part to another part, the fastener being elongated along a longitudinal axis, the fastener including:

a shank being elongated along the longitudinal axis, the shank having a base end and a free end, the shank having a shank surface with a portion of the shank surface forming threads;

a head positioned on the base end of the shank, the head having:

a crown having a crown surface, the crown surface defining a crown plane, the crown surface having a central portion and a peripheral portion; and a perimeter configured to be engaged by a tool for manipulating the fastener, the perimeter and the crown converging at a peripheral edge, the peripheral edge surrounding the crown; and a protective coating positioned on the head, the coating being positioned on the peripheral portion of the crown of the head, the coating extending from the peripheral edge inwardly toward the central portion of the crown;

wherein the head and the shank are formed of a first material having a first hardness measurement, the protective coating being formed of a second material having a second hardness measurement, wherein the second material is different than the first material and a magnitude of the second hardness measurement is greater than the magnitude of the first hardness measurement;

wherein the perimeter of the head has a plurality of flats, the flats each being substantially planar and extending in a respective flat face plane, the flat face planes of the flats being oriented substantially perpendicular to the plane of the crown surface, adjacent said flats of the perimeter converging at point edges, the point edges extending substantially parallel to the longitudinal axis of the fastener; and wherein the flats of the perimeter of the head are free of the coating.

5. The fastener of claim 4 wherein the protective coating does not extend through the flat face planes of the flats of the perimeter.

6. The fastener of claim 4 wherein the flat face planes of the perimeter that are positioned adjacent to each other are oriented oblique to each other.

7. The fastener of claim 4 wherein the flat face planes of the perimeter are each oriented substantially perpendicular to the crown plane of the crown surface.

8. The fastener of claim 4 wherein the coating extends along a continuous path along the perimeter of the peripheral portion of the crown surface adjacent to the peripheral edge and about the central portion of the crown surface.

9. The fastener of claim 4 wherein the protective coating does not extend to the central portion of the crown surface of the crown of the head.

10. A fastener configured to fasten one part to another part, the fastener being elongated along a longitudinal axis, the fastener including:

a shank being elongated along the longitudinal axis, the shank having a base end and a free end, the shank having a shank surface with a portion of the shank surface forming threads;

a head positioned on the base end of the shank, the head having:

a crown having a crown surface, the crown surface defining a crown plane the crown surface having a central portion and a peripheral portion, the peripheral portion substantially surrounding the central portion; and a perimeter configured to be engaged by a tool for manipulating the fastener, the perimeter and the crown converging at a peripheral edge, the peripheral edge surrounding the crown, the perimeter of the head having a plurality of flats, the flats each being substantially planar and extending in a respective flat face plane, the flat face planes of the flats being oriented substantially perpendicular to the plane of the crown surface, adjacent said flats of the perimeter converging at point edges, the point edges extending substantially parallel to the longitudinal axis of the fastener; and a protective coating positioned on the head, the coating being positioned on the crown of the head, the coating being positioned on the peripheral portion of the crown, the coating extending from the peripheral edge inwardly toward the central portion of the crown, the coating extends along a continuous path along the perimeter of peripheral portion of the crown surface about the central portion of the crown surface, the central portion of the crown surface being free of the protective coating and the flats of the perimeter of the head being free of the protective coating;

wherein the head and the shank are formed of a first material having a first hardness measurement, the protective coating being formed of a second material having a second hardness measurement, wherein the second material is different than the first material and a magnitude of the second hardness measurement is greater than the magnitude of the first hardness measurement.

11. A system comprising:

a harvester having a cutterhead configured to cut plant materials received by the harvester, the cutterhead having a central drum, a plurality of knife mounting bases on an exterior of the central drum, and a plurality of knives each removably mounted on one of the knife mounting bases; and a plurality of fasteners, each fastener fastening a said knife to a said knife mounting base, the fastener being elongated along a longitudinal axis, each fastener including:

a shank being elongated along the longitudinal axis, the shank having a base end and a free end, the shank having a shank surface with a portion of the shank surface forming threads;

a head positioned on the base end of the shank, the head having:

a crown having a crown surface, the crown surface defining a crown plane, the crown surface having a central portion and a peripheral portion; and a perimeter configured to be engaged by a tool for manipulating the fastener, the perimeter and the crown converging at a peripheral edge, the peripheral edge surrounding the crown; and a protective coating positioned on the head, the coating being positioned on the crown of the head, the coating being positioned on the peripheral portion of the crown, the coating extending from the peripheral edge inwardly toward the central portion of the crown;

wherein the head and the shank are formed of a first material having a first hardness measurement, the protective coating being formed of a second material having a second hardness measurement, wherein the second material is different than the first material and a magnitude of the second hardness measurement is greater than the magnitude of the first hardness measurement;

wherein the peripheral portion substantially surrounds the central portion; and wherein the protective coating does not extend to the central portion of the crown surface of the crown of the head.

12. The system of claim 11 wherein the coating extends along a continuous path along the perimeter of peripheral portion of the crown surface adjacent to the peripheral edge and about the central portion of the crown surface.

13. The system of claim 11 wherein the coating protrudes from the crown of the head and the crown plane of the crown surface.

14. A system comprising:

a harvester having a cutterhead configured to cut plant materials received by the harvester, the cutterhead having a central drum, a plurality of knife mounting bases on an exterior of the central drum, and a plurality of knives each removably mounted on one of the knife mounting bases; and a plurality of fasteners, each fastener fastening a said knife to a said knife mounting base, the fastener being elongated along a longitudinal axis, each fastener including:

a shank being elongated along the longitudinal axis, the shank having a base end and a free end, the shank having a shank surface with a portion of the shank surface forming threads;

a head positioned on the base end of the shank, the head having:

a crown having a crown surface, the crown surface defining a crown plane, the crown surface having a central portion and a peripheral portion; and a perimeter configured to be engaged by a tool for manipulating the fastener, the perimeter and the crown converging at a peripheral edge, the peripheral edge surrounding the crown; and a protective coating positioned on the head, the coating being positioned on the crown of the head, the coating being positioned on the peripheral portion of the crown, the coating extending from the peripheral edge inwardly toward the central portion of the crown;

wherein the head and the shank are formed of a first material having a first hardness measurement, the protective coating being formed of a second material having a second hardness measurement, wherein the second material is different than the first material and a magnitude of the second hardness measurement is greater than the magnitude of the first hardness measurement;

wherein the perimeter of the head has a plurality of flats, the flats each being substantially planar and extending in a respective flat face plane, the flat face planes of the flats being oriented substantially perpendicular to the plane of the crown surface, adjacent said flats of the perimeter converging at point edges, the point edges extending substantially parallel to the longitudinal axis of the fastener; and wherein the flats of the perimeter of the head are free of the coating.

15. The system of claim 14 wherein the protective coating does not extend through the flat face planes of the flats of the perimeter.

16. The system of claim 14 wherein the flat face planes of the perimeter that are positioned adjacent to each other are oriented oblique to each other.

17. The system of claim 14 wherein the flat face planes of the perimeter are each oriented substantially perpendicular to the crown plane of the crown surface.

18. The system of claim 14 wherein the coating extends along a continuous path along the perimeter of peripheral portion of the crown surface adjacent to the peripheral edge and about the central portion of the crown surface.

19. The system of claim 14 wherein the protective coating does not extend to the central portion of the crown surface of the crown of the head.

20. A fastener configured to fasten one part to another part, the fastener being elongated along a longitudinal axis, the fastener including:

a shank being elongated along the longitudinal axis, the shank having a base end and a free end, the shank having a shank surface with a portion of the shank surface forming threads;

a head positioned on the base end of the shank, the head having:

a crown having a crown surface, the crown surface defining a crown plane the crown surface having a central portion and a peripheral portion; and a perimeter configured to be engaged by a tool for manipulating the fastener, the perimeter and the crown converging at a peripheral edge, the peripheral edge surrounding the crown;

wherein the head of the fastener includes a perimeter recess positioned between the crown and the perimeter of the head; and a protective rim positioned in the perimeter recess of the head, the protective rim extending substantially continuously about the crown of the head;

wherein the head and the shank are formed of a first material having a first hardness measurement, the protective rim being formed of a second material having a second hardness measurement, wherein the second material is different than the first material and a magnitude of the second hardness measurement is greater than the magnitude of the first hardness measurement.

* * * * *